United States Patent [19]

Monden et al.

[11] 4,287,242
[45] Sep. 1, 1981

[54] SPRAY-COATING PROCESS

[75] Inventors: Takeshi Monden, Mie; Yoshiro Shiba; Tosihiro Momonaka, both of Yokkaichi; Shigeru Kobayashi, Suzuka; Kazuo Oda, Tokyo, all of Japan

[73] Assignees: Japan Synthetic Rubber Co., Ltd., Tokyo; Japan Latex Compounding Co., Ltd., Yokkaichi, both of Japan

[21] Appl. No.: 64,760

[22] Filed: Aug. 8, 1979

[30] Foreign Application Priority Data

Dec. 16, 1978 [JP] Japan ................................ 53/154614

[51] Int. Cl.³ .............................................. B05D 1/02
[52] U.S. Cl. .................................. 427/426; 427/421
[58] Field of Search ................................ 427/426, 421

[56] References Cited

U.S. PATENT DOCUMENTS

| 1,841,076 | 1/1932 | Zimmerli et al. | 427/421 X |
| 3,667,998 | 6/1972 | Esser | 427/426 |
| 3,785,852 | 1/1974 | Schleidt | 427/426 |

FOREIGN PATENT DOCUMENTS

| 136080 | 7/1947 | Australia | 427/426 |
| 853642 | 10/1970 | Canada | 427/426 |
| 1517381 | 3/1967 | France | 427/426 |
| 815640 | 7/1959 | United Kingdom | 427/426 |
| 1167265 | 10/1969 | United Kingdom | 427/426 |

Primary Examiner—Shrive P. Beck
Attorney, Agent, or Firm—Oblon, Fisher, Spivak, McClelland & Maier

[57] ABSTRACT

A spray-coating process which comprises spraying a rubber-asphalt anionic emulsion having a total solid content of 70% by weight or more and a 1–15% by weight aqueous solution of a polyvalent metal salt almost simultaneously by means of separate airless type spraying machines to continuously contact and mix said emulsion with said aqueous solution in the space between the spraying machine and the surface of a substrate to be coated and on the substrate surface, thereby forming a rubber-asphalt solid layer on the substrate surface. By this process, a rubber-asphalt solid layer having a thickness of 4 mm or more and having a waterproof, moisture-proof or gas-proof characteristics can be formed rapidly on the substrate surface.

9 Claims, 1 Drawing Figure

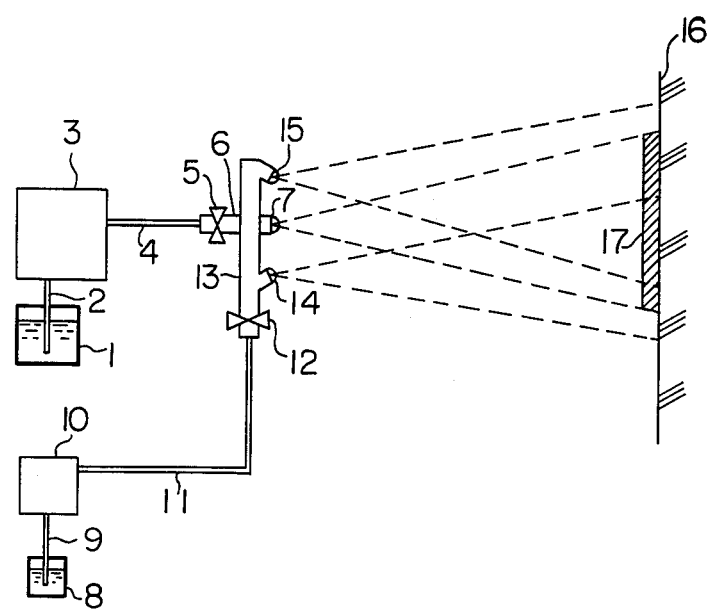

SPRAY-COATING PROCESS

BACKGROUND OF THE INVENTION

1. Field of the Invention

This invention relates to a process for rapidly forming a water-proof, moisture-proof or gas-proof rubber asphalt solid layer on a substrate surface by separately spraying a highly concentrated rubber-asphalt emulsion and a coagulant in the state of mist by means of a spraying machine to continuously contact and mix them together in the space between the spraying machine and the substrate surface and on the substrate surface.

2. Description of the Prior Art

A rubber-asphalt emulsion is mainly used as a waterproof material, and its application is usually practised by coating it on the substrate surface by means of a brush, trowel or the like. Since this process is limited in one-coat amount, the number of applications must be increased in this type of coating which requires a considerable coating thickness, and this is troublesome. If a large quantity of coating material is applied at once, a long period of time is necessary for drying it, the coating formed is apt to lack uniformity, and there can appear cracks, unevenness and the like sometimes. If a vertical wall or a ceiling is coated with a high flow type rubber-asphalt emulsion in consideration of workability, the emulsion drips down in the course of coating and just after coating to make various troubles. Accordingly, coating by means of a trowel or brush is poor in workability, complicated and unsuitable for the coating of broad area. Even in the case of such a coating process the one-coat amount can be increased by adding a mild coagulant such as sodium silicofluoride to a rubber-asphalt emulsion, but this method is limited in working time before coagulation, and it is necessary to blend a coagulant with the emulsion just before use, so that this method is troublesome and cannot be said to be effective.

A process which was developed with the aim of overcoming these difficulties is disclosed in, for example, Japanese Patent Application Kokai (Laid-Open) No. 31606/75. This process comprises spraying a stream of (A) highly concentrated bituminous substance-latex mixture and a stream of (B) an emulsion mixture comprising a coagulant and an aqueous emulsion containing at least one member selected from the group consisting of bituminous substances, oils and latexes while continuously mixing the two streams. In this process, the emulsion mixture (B) is quite instable because it has a high concentration and contains a coagulant, so that the nozzle of a spraying machine is apt to clog. Furthermore, the kind of coagulant usable in this process is limited in order to prevent the coagulation of the emulsion mixture (B) itself, due to which it takes a longer period of time until the formation of solid layer.

The present inventors conducted repeated studies about these points to find that a rubber-asphalt solid layer can be formed on the substrate surface without any of the above-mentioned troubles by a combined technique comprising using a rubber-asphalt emulsion having a total solid content of 70% or more, spraying a coagulant in the form of an aqueous solution not mixed with an emulsion, spraying them separately by means of airless type spraying machines, and contacting and mixing them together in the space between the spraying machine and the surface of a substrate to be coated and on the substrate surface.

SUMMARY OF THE INVENTION

It is an object of this invention to provide a process for forming a rubber-asphalt solid layer on the surface of a substrate.

It is another object of this invention to provide a process for rapidly forming a water-proof, moisture-proof or gas-proof rubber-asphalt solid layer on the surface of a substrate.

It is a further object of this invention to provide a process for forming a rubber-asphalt solid layer free from the faults of the prior processes on the substrate surface.

Other objects and advantages of this invention will become apparent from the following description.

According to this invention, there is provided a spray-coating process which comprises spraying a rubber-asphalt emulsion having a total solid content of 70% by weight on more and a 1–15% by weight aqueous solution of a polyvalent metal salt almost simultaneously from separate airless type spraying machines to continuously contact and mix said emulsion with said aqueous solution in the space between the spraying machine and the surface of a substrate to be coated and on the substrate surface, thereby forming a rubber-asphalt solid layer on the substrate surface.

This invention can improve greatly the technique disclosed in Japanese Patent Application Kokai No. 31,606/75 and facilitates coating a substrate with a rubber-asphalt emulsion and enables easy formation of a thick coating on the substrate by one spraying. That is to say, in Japanese Patent Application Kokai No. 31,606/75, the mixed emulsion (B) containing a coagulant is used as a coagulant for the high concentration bituminous substance-latex mixture (A). However, in general, a coagulant breaks an emulsion and coagulates the same. Accordingly, the emulsion (B) containing a coagulant is low in emulsion-stability, and therefore, the emulsion is easily coagulated by the mechanical action to which the emulsion is subjected when it passes through the nozzle for spraying by means of a sprayer, whereby the nozzle is blocked with the coagulated product. Therefore, it was very difficult to continuously spray the mixed emulsion (B). However, in the process of this invention, the rubber-asphalt emulsion is not contacted with the aqueous polyvalent metal salt solution which is a coagulant prior to being sprayed from a sprayer, and are contacted only after being sprayed. Therefore, the nozzle of a sprayer is not blocked with the coagulation product of the rubber-asphalt emulsion and hence continuous spraying is possible.

The mixed emulsion (B) containing a coagulant is, as a matter of course, required to be in the emulsion state before spraying. Therefore, it is impossible to use a coagulant having a great coagulating activity, and it takes a long time for coagulating the high concentration bituminous substance latex mixture (A) and the mixed emulsion (B) containing a coagulant by mixing them, and hence the coating flows to be deformed. However, in the process of this invention, the aqueous polyvalent metal salt solution which is a coagulant has a high coagulating activity. Therefore, the coating formed by mixing the rubber-asphalt emulsion and the aqueous polyvalent metal salt solution does not flow or deform, and one spraying of the mixture enables a thick coating. The liberation of water from the emulsion is fast and hence the time for drying the coating is short.

BRIEF DESCRIPTION OF THE FIGURE

The accompanying drawing is a FIGURE illustrating one embodiment of this invention, wherein:
1 is a rubber-asphalt emulsion,
2 and 9 are suction pipes,
3 and 10 are airless type spraying machines,
4 and 11 are pressure hoses,
5 and 12 are cocks,
6 and 13 are spray guns,
7, 14 and 15 are nozzles,
8 is an aqueous solution of a polyvalent metal salt,
16 is a wall surface, and
7 is a rubber-asphalt solid layer.

DETAILED DESCRIPTION OF THE INVENTION

This invention will be explained in detail below with reference to the accompanying drawings.

The rubber-asphalt emulsion used in this invention is required to be anionic, so that the surfactant employed therein is mainly an anionic one. Preferably, the amount of said surfactant is as small as possible. Usually, it is 3% by weight or less based on the weight of the rubber-asphalt emulsion.

If the amount of a nonionic surfactant used in combination with the anionic surfactant is too large or the total amount of surfactants is too large, the coagulation is incomplete or the rate of coagulation is too low upon contact with the polyvalent metal salt, so that the formation of a solid layer on the substrate surface becomes incomplete.

It is necessary that the solid content of rubber-asphalt in the emulsion is 70% by weight or more, and the preferable content is 80% by weight or more. If the solid content is less than the above, the amount of a surfactant necessary for maintaining the stability of emulsion increases, so that the above-mentioned problems arise. At the same time, the quantity of water liberated upon the contact with a polyvalent metal salt and upon coagulation increases, so that the solid layer formed is rough, tends to blister and shows a greater shrinkage with the lapse of time.

The rubbers usable in the rubber-asphalt include natural rubber, styrene-butadiene rubber, butyl rubber, polybutadiene rubber, polyisoprene rubber, chloroprene rubber and the like, and it is preferable that said rubber comprises the styrene-butadiene rubber or modified styrene-butadiene rubber as a main constituent from the viewpoint of performances of rubber-asphalt solid layer and economy. Though the content of rubber in the rubber-asphalt is not critical, an amount of 5–50% by weight is most preferable from the viewpoint of performances of rubber-asphalt solid layer.

The asphalts usable in this invention include natural asphalt, straight asphalt, blown asphalt and the like, any of which may be used.

It is necessary to control the amounts of said rubber and said asphalt so that their total solid content becomes 70% by weight or more and preferably 80% by weight or more based on the weight of the rubber-asphalt emulsion. It is desirable that the solid content in the rubber-asphalt emulsion does not exceed 90% by weight for facilitating the preparation of the rubber-asphalt emulsion and in order for the viscosity of the emulsion not to become too high.

Though the polyvalent metal salt used as a coagulant is not critical, it must be readily soluble in water and excellent in ability to coagulate the emulsion. It is also necessary that the polyvalent metal salt has been confirmed in respect of safety to human body because workers may possibly breathe it in or come into contact with it on the skin and the environment of working area can be polluted by it. In this sense, calcium chloride, iron alum, potassium alum and the like are preferable because of their effectiveness and safety. If the aqueous solution of polyvalent metal salt has too high a concentration, it corrodes metals contacted therewith such as spraying machine, it deposits a salt to clog the spray gun or the coagulation on the emulsion is so strong that the finish of solid layer formed on the substrate surface becomes rough. If the aqueous solution has too low a concentration, incomplete coagulation of rubber-asphalt emulsion is caused and the amount of the water liberated upon coagulation becomes too large. Accordingly, the aqueous solution of a polyvalent metal salt should preferably have a concentration of 1–15% by weight, particularly preferably about 3–6% by weight, though it may be varied depending upon the kind of metal salt.

The spraying machine used in this invention must be of the airless type. In the prior techniques, the so-called air spray type of machines, by which a material is sprayed by the aid of compressed air, have been used widely. Though this type of spraying machine is simple in structure and excellent in spraying workability, the machine has a fault that a material to be sprayed is vigorously scattered away, and hence, when contacting and mixing the emulsion with the coagulant, the coagulation of the emulsion becomes incomplete. That is, the pollution of environment by the enormously scattered away black-colored rubber-asphalt emulsion is a serious problem, and the amount of material scattered away being large means that the material is not jetted concentratively into a limited area and the contact of the material with the coagulant is not sufficiently effective. In contrast to it, an airless type spraying machine gives the material to be sprayed a high pressure by means of an appropriate pump to spray the material through a nozzle. The material can be sprayed onto a limited pattern with a very high efficiency because air is not used. Since the sprayed material collides against the substrate surface with a high speed, the adhesion of material is good and a dense layer of sprayed material can be formed. At the same time, the amount of the material scattered away is so small that the loss of the material to be sprayed is small. As above, the use of an airless type spraying machine is advantageous in many respects. Such an airless type includes those driven by a plunger type pump which utilizes an air- or oil-pressure motor, those driven by a motorized diaphragm type pump, and the like.

The process of this invention will be illustrated below with reference to the accompanying drawings.

A rubber-asphalt emulsion 1 having a total solid content of 70% by weight or more and an aqueous polyvalent metal salt solution 8 are placed in appropriate vessels. An airless spraying machine 3 for the rubber-asphalt emulsion and an airless spraying machine 10 for the aqueous solution of a polyvalent metal salt are also prepared. The rubber-asphalt emulsion and the aqueous polyvalent metal salt solution are sucked up from pipes 2 and 9 of their respective pumps, passed through the pumps of spraying machines where they are pressurized to reach spray guns 6 and 13 through pressure hoses 4 and 11. If cocks 5 and 12 attached at the inlet of the spray guns are opened, the emulsion and the solution are jetted from the tips of the guns, i.e. from the jetting holes. The jetting holes are equipped with small holes having particular shapes, the so-called nozzles 14, 15 and 7, to determine the quantity and pattern of the sprays. Nozzle 7 for the rubber-asphalt emulsion is placed at the center, while nozzles 14 and 15 for the aqueous polyvalent metal salt solution are placed at both ends at distances of 10 cm or less from 7 and with slight gradients towards the center. At first, cock 12 is opened to spray the pressurized aqueous polyvalent metal salt solution from nozzles 14 and 15 onto the substrate surface in the form of mist having two expanses. Subsequently, cock 5 is opened, whereby the mist of pressurized rubber-asphalt emulsion jetted from nozzle 7 is contacted and mixed in the space with the mist of the aqueous solution of polyvalent metal salt jetted from nozzles 12 and 15, so that the former mist is enveloped with the latter mist, and ultimately collides against the substrate surface 16 where the emulsion is coagulated by the action of metal salt to form a rubber-asphalt solid layer 17. As mentioned above, the rubber-asphalt emulsion can completely be coagulated by a small quantity of coagulant in a very short period of time (simultaneously with the arrival at the substrate surface) to allow the formation of a solid layer on the substrate surface. Only one shot of spraying is enough to yield a desired thickness, so that repeated spraying is unnecessary.

Though the proportion of the aqueous polyvalent metal salt solution to the rubber-asphalt emulsion varies depending on their kinds and concentrations, the proportion is preferably about 1/15 to ⅓ by volume, more preferably 1/10 to ⅕ by volume. If the proportion of the aqueous polyvalent metal salt solution is outside the above-mentioned range, a satisfactory rubber-asphalt solid layer is difficult to obtain because of incomplete coagulation of rubber-asphalt emulsion or liberation of a large quantity of water upon coagulation. Accordingly, the spraying machine for the aqueous polyvalent metal salt solution may have a smaller capacity than that of the spraying machine for the rubber-asphalt emulsion.

According to the process of this invention, the spray makes a straight advance at a high speed owing to the characteristic feature of the airless type spraying machine. In addition, the spray of the rubber-asphalt emulsion is enveloped from both sides in the spray of the aqueous polyvalent metal salt solution and the two are contacted and mixed with each other, whereby the rubber-asphalt emulsion is coagulated in the space and the fine particles of the emulsion are made much larger particles. Thus, the spray of the rubber-asphalt composed mainly of the much larger rubber-asphalt particles collides against the substrate surface at a high speed, to which the particles adhere satisfactorily owing to the sticky character of the rubber-asphalt. At the same time, the particles of coagulant also collide against the substrate surface to make the coagulation of the rubber-asphalt emulsion complete and also the coagulation of the rubber-asphalt solid layer complete. In some cases where the substrate surface has a particular nature, it is possible to improve the adhesion between the substrate surface and the rubber-asphalt by applying an appropriate primer to the substrate surface before the spraying treatment. As said primer, anionic or cationic rubber-asphalt emulsions, rubber latexes, resin emulsions and the like are preferable.

This invention can be applied to the formation of a water-proof layer on a housetop and outer wall, the formation of a moisture-proof and gas-proof layer in a freezer-refrigerator and heat insulation box, the formation of a gas-proof layer in a fumigating house and silo, the formation of a water-proof layer on an underground structure and bridge, the formation of a water-proof and heat-insulating layer on a chemical-storing house, etc., and the application can be practised with rapidity and high efficiency without polluting the environments. Particularly, this invention provides a very safe and highly effective means to the construction works of a great area.

DESCRIPTION OF PREFERRED EMBODIMENT

This invention will be illustrated more specifically below referring to the Example and Comparative Examples.

EXAMPLE 1

A rubber-asphalt emulsion having a total solid content of 80% by weight was prepared by mixing 100 parts by weight of a highly concentrated styrene-butadiene rubber latex (the amount of anionic surfactant: 1.3% by weight) having a solid content of 67% by weight kept at 35° C. with 180 parts by weight of 80–100 straight asphalt kept at 120° C. to give a rubber-asphalt emulsion having a water content of 11.08% by weight, followed by adding thereto a 5% by weight aqueous potassium rosinate solution. On the other hand, a 5% by weight aqueous calcium chloride solution was prepared separately.

An air motor type airless spraying machine [Newpower APN 35 (pressure ratio, 35:1; maximum output, 20 liters/minute, manufactured by Asahi-Ohkuma Co.)] and another machine [Newpower APK 25 (pressure ratio, 25:1; maximum output, 6 liters/minute, manufactured by Asahi-Ohkuma Co.)] were arranged. The suction side of the APN 35 machine was placed in a vessel containing the rubber-asphalt emulsion. A wire gauze filter was set on the tip of the suction hose. The suction side of the APK 25 machine was placed in a vessel containing the aqueous calcium chloride solution, and a wire gauze filter was set on the tip of the suction hose. The outlet of the APN 35 machine was connected to a pressure hose having an inner diameter of 12.8 mm and a length of 50 m. The outlet of the APK 25 machine was connected to a pressure hose having an inner diameter of 6.5 mm and a length of 50 m. The tips of the hoses were connected to two spray guns, one of which had one jetting hole for the rubber-asphalt emulsion and was placed at the center, and the other two jetting holes for the aqueous calcium chloride solution, each having a gradient of 5° to the center, and was placed so that the center jetting hole was arranged between the two jetting holes at a distance of each 3.5 cm. A cock was mounted at the inlet of each gun. The pressures of the pumps of APN 35 and APK 25 machines were adjusted to 5 and 2 kg/cm$^2$, respectively, by sending compressed air under a pressure of 7 kg/cm$^2$ to the primary sides of the airless spraying machines. The spray gun was directed to the surface of a cement mortar wall 50–60 cm distant from the gun, the gun cock for the aqueous calcium chloride solution was opened to jet the aqueous calcium chloride solution at a rate of 1 liter/minute, and then the gun cock for the rubber-asphalt emulsion was opened to jet the rubber-asphalt emulsion at a rate of 6 liters/minute. The spray gun was shifted at a speed of 40 cm/sec in parallel with the wall surface. Thus, a rubber-asphalt solid layer having a thickness of about 4 mm was formed on the surface of cement mortar wall just after the spraying. The rubber-asphalt solid layer had no fluidity at all. Though the water liberated upon the coagulation of rubber-asphalt emulsion was observable on the surface of the solid layer, the amount of the water was not so great as to produce a descending flow on the wall surface. The extent of pollution was investigated with a white-colored paper board standing at a distance of 1 m from the site of spraying. As the result, only a very small number of black-colored spots were observed on the paper board.

The adhesion between the formed rubber-asphalt layer and the wall surface, measured 24 hours after the spraying, was 4 kg/cm$^2$. After aging for 10 days, the formed rubber-asphalt layer was stripped off and subjected to a tensile test according to JIS A-6201. The strength at break and the elongation were found to be 2.3 kg/cm$^2$ and 2,000% or more, respectively. The rubber-asphalt layer was subjected to a water permeability test according to JIS A-1404. Penetration of water was not observed at all.

EXAMPLE 2

By use of the same airless spray machines as in Example 1, the same rubber-asphalt emulsion as in Example 1 was jetted at a rate of 6 liters/min and the same aqueous calcium chloride solution as in Example 1 was jetted at a rate of 1.2 liters/min or 0.8 liter/min to spray the two on a substrate.

When the amount of the aqueous calcium chloride solution jetted was 1.2 liters/min, the amount of water liberated was somewhat larger than in Example 1, but otherwise the same result was obtained as in Example 1.

When the amount of the aqueous calcium chloride solution jetted was 0.8 liter/min, the amount of water liberated was smaller than in Example 1, and otherwise the same result was obtained as in Example 1.

EXAMPLE 3

In the same manner as in Example 1, spraying was effected, except that the concentration of calcium chloride in the aqueous calcium chloride solution was changed to 10% by weight. As a result, the surface of the resulting coating was somewhat rougher than in Example 1, and otherwise the same result was obtained.

EXAMPLE 4

Spraying was effected in the same manner as in Example 1, except that a 5% by weight aqueous iron alum solution or a 5% by weight aqueous potassium alum solution was substituted for the aqueous calcium chloride solution, to obtain the same result as in Example 1.

EXAMPLE 5

To the same rubber-asphalt emulsion having a solid content of 80% by weight as in Example 1 was added a 5% by weight aqueous pottassium rosinate solution to prepare a rubber-asphalt emulsion having a solid content of 75% by weight. Spraying was effected in the same manner as in Example 1, except that said rubber-asphalt emulsion was substituted for the rubber-asphalt emulsion in Example 1, to obtain the same result as in Example 1, except that the amount of water liberated was somewhat larger than in Example 1.

EXAMPLE 6

A rubber-asphalt emulsion having a water content of 10.7% by weight was prepared in the same manner as in Example 1 using 100 parts by weight of a styrene-butadiene copolymer rubber latex having a solid content of 67% by weight (the amount of anionic surfactant: 1.3% by weight) and 190 parts by weight of 80-100 straight asphalt. Subsequently, a 5% by weight aqueous potassium rosinate solution was added to the emulsion to prepare a rubber-asphalt emulsion having a solid content of 88% by weight. Spraying was effected in the same manner as in Example 1, except that said rubber-asphalt emulsion having a solid content of 88% by weight was substituted for the rubber-asphalt emulsion in Example 1. As a result, it was found that since the viscosity of the emulsion prepared in this Example was higher than the emulsion in Example 1, a higher pressure for jetting was required, and the spraying pattern angle was narrower than in Example 1. However, as compared with Example 1, the amount of water liberated was small, and otherwise the same result as in Example 1 was obtained.

COMPARATIVE EXAMPLE 1

A rubber-asphalt emulsion having a total solid content of 50% by weight was prepared by adding a 5% by weight aqueous potassium rosinate solution to the same rubber-asphalt emulsion having a solid content of 80% by weight as in Example 1. The same aqueous calcium chloride solution and the same spraying machines as in Example 1 were also arranged. Spraying was practised against a surface of cement mortar wall by the same procedure as mentioned in Example 1. As compared with that formed in Example 1, the rubber-asphalt layer formed on the wall surface had a rougher structure and the water liberated on the surface of the layer flowed down to form a considerable puddle at the bottom of the wall. A partial occurrence of blister was also observed, probably due to the water liberated. The dripping of water did not cease even after 10 hours. The adhesion force between wall surface and rubber-asphalt layer was 3 kg/cm$^2$ as measured after 24 hours. After aging for 10 days, the strength at break and the elongation were found to be 1.5 kg/cm$^2$ and 2,000% or more, respectively, in a tensile test according to JIS A-6201.

COMPARATIVE EXAMPLE 2

Using the same rubber-asphalt emulsion and the same aqueous calcium chloride solution as in Example 1, the procedure of Example 1 was repeated, except that the airless type spraying machine was replaced by an air spray type spraying machine. As the result, similarly to Comparative Example 1, the water liberated flowed down, a partial blistering occurred, the environments were markedly polluted, and a large quantity of sprayed material was lost. The adhesion after 24 hours was 3 kg/cm$^2$, and the strength at break and the elongation were found to be 1.8 kg/cm$^2$ and 2,000% or more, respectively, demonstrating the inferiority to the process of this invention.

What is claimed is:

1. A spray-coating process which comprises spraying a rubber-asphalt anionic emulsion having a total solid content of at least 80% by weight and an aqueous solution containing 1-15% by weight of a polyvalent metal salt almost simultaneously by means of separate airless type spraying machines to continuously contact and mix said emulsion with said aqueous solution in the space between the spraying machine and the surface of a substrate to be coated and on the substrate surface, thereby forming a rubber-asphalt solid layer on the substrate surface.

2. A process according to claim 1, wherein the ratio of said aqueous polyvalent metal salt solution to said rubber-asphalt anionic emulsion is in the range of 1/15 to ½ by volume.

3. A process according to claim 1, wherein the rubber in said rubber-asphalt anionic emulsion is natural rubber, styrene-butadiene rubber, butyl rubber, polybutadiene rubber, polyisoprene rubber or chloroprene rubber.

4. A process according to claim 1, wherein the rubber in said rubber-asphalt anionic emulsion is styrene-butadiene rubber or modified styrene-butadiene rubber.

5. A process according to claim 1, wherein said rubber-asphalt anionic emulsion has a rubber content of 5-50% by weight.

6. A process according to claim 1, wherein said polyvalent metal salt is calcium chloride, iron alum or potassium alum.

7. A process according to claim 1 or 6, wherein said aqueous polyvalent metal salt solution has a concentration of 3-6% by weight.

8. A process according to claim 1, wherein said rubber-asphalt anionic emulsion is a styrene-butadiene rubber-80-100 straight asphalt emulsion having a solid content of 80% by weight, and said polyvalent metal salt is calcium chloride.

9. A process according to claim 1 or 2, wherein said rubber-asphalt anionic emulsion is sprayed from one jetting hole and said aqueous solution of polyvalent metal salt is sprayed from two jetting holes placed above and under the first jetting hole.

* * * * *